United States Patent
Hsiao et al.

(10) Patent No.: US 9,279,933 B2
(45) Date of Patent: Mar. 8, 2016

(54) DUAL-SIDED DISPLAY DEVICE AND ITS BACKLIGHT MODULE

(71) Applicant: Shenzhen China Star Optoelectronics Technology Co. Ltd., Shenzhen, Guangdong (CN)

(72) Inventors: Yuchun Hsiao, Shenzhen (CN); Guofu Tang, Shenzhen (CN); Yanxue Zhang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 220 days.

(21) Appl. No.: 14/126,848

(22) PCT Filed: Nov. 8, 2013

(86) PCT No.: PCT/CN2013/086790
§ 371 (c)(1),
(2) Date: Dec. 16, 2013

(87) PCT Pub. No.: WO2015/066898
PCT Pub. Date: May 14, 2015

(65) Prior Publication Data
US 2015/0205037 A1    Jul. 23, 2015

(30) Foreign Application Priority Data
Nov. 5, 2013    (CN) .......................... 2013 1 0542522

(51) Int. Cl.
*F21V 7/04*        (2006.01)
*G09F 13/04*       (2006.01)
(Continued)

(52) U.S. Cl.
CPC .............. *G02B 6/008* (2013.01); *G02B 6/0063* (2013.01); *G02B 6/0068* (2013.01);
(Continued)

(58) Field of Classification Search
CPC .. G02B 6/0088; G02B 6/0063; G02B 6/0068; G02B 6/0085; G02B 6/0093; G02F 1/1333
USPC ............. 362/613, 97.1, 97.2, 97.3, 97.4, 633, 362/632, 634; 349/61, 62, 65
See application file for complete search history.

(56) References Cited

U.S. PATENT DOCUMENTS

2004/0246402 A1* 12/2004 Yu ..................... G02F 1/133615
349/61
(Continued)

FOREIGN PATENT DOCUMENTS

JP        2007025360 A  *  2/2007

OTHER PUBLICATIONS

Machine English Translation of JP2007025360A to Tsugawa,Kiichi Feb. 2007.*

*Primary Examiner* — Anh Mai
*Assistant Examiner* — Glenn Zimmerman
(74) *Attorney, Agent, or Firm* — Andrew C. Cheng

(57) ABSTRACT

The display device contains a light guide plate, a light source unit adjacent to a light entry face of the light guide plate, a heat dissipation base carrying the light source unit, first and second frame members fixedly joined to the heat dissipation base, and first and second display panels. The first and second frame member are positioned above and below a first light emission face and a second light emission face of the light guide plate, respectively. The first and second display panels are fixedly positioned on the first frame member and beneath the second frame member, oppositely to the first and second light emission face, respectively. The display device achieves superior heat dissipation, narrow bezel, and enhanced structural strength.

8 Claims, 1 Drawing Sheet

(51) Int. Cl.
*G09F 13/08* (2006.01)
*F21V 8/00* (2006.01)
*G02F 1/1333* (2006.01)
*G02F 1/1335* (2006.01)

(52) U.S. Cl.
CPC .......... *G02B 6/0085* (2013.01); *G02B 6/0093* (2013.01); *G02F 1/1333* (2013.01); *G02F 1/133615* (2013.01); *G02F 2001/133342* (2013.01); *G02F 2001/133628* (2013.01)

(56) References Cited

U.S. PATENT DOCUMENTS

| 2009/0096957 | A1* | 4/2009 | Hiyama | G02B 6/003 349/65 |
| 2009/0290378 | A1* | 11/2009 | Wu | G02B 6/0063 362/617 |
| 2013/0258246 | A1 | 10/2013 | Kim | |

* cited by examiner

DUAL-SIDED DISPLAY DEVICE AND ITS BACKLIGHT MODULE

BACKGROUND OF THE INVENTION

1. Field of the Invention

The present invention relates to the field of LCD (Liquid Crystal Display) techniques, and in particular to a dual-sided display device and its backlight module.

2. The Related Arts

As the LCD technology continuously progresses, LCD devices are more and more applied in various fields. Conventionally, LCD devices are single-sided. For applications that require display to both a front side and a back side, usually two LCD devices are used back to back. This is certainly not a satisfactory solution not only from a cost but also from a design point of view.

Therefore, dual-sided LCD devices are developed so as to resolve the cost issue of using two single-sided LCD devices back to back, and to achieve greater applicability. However, existing dual-sided LCD devices suffer lower structural strength due to the lack of a back plate assembly. Existing dual-sided LCD devices also cannot achieve narrow bezel.

SUMMARY OF THE INVENTION

To address the technical issue of the prior art described above, an objective of the present invention is to provide a dual-sided display device which contains a light guide plate having at least a light entry face, a first light emission face, and a second light emission face oppositely positioned to the first light emission face; at least a light source unit positioned adjacent to the light entry face; at least a heat dissipation base carrying the light source unit and dissipating the heat produced by the light source unit to the environment; a first frame member and a second frame member, where the first frame member is positioned above the first light emission face, the second frame member is positioned below the second light emission face, the first and second frame members are fixedly joined to the heat dissipation base, and the light guide plate is fixedly positioned in an accommodation space surrounded by the first and second frame members, and heat dissipation base; and a first display panel and a second display panel, where the first display panel is fixedly positioned on the first frame member oppositely to the first light emission face, the second display panel is fixedly positioned beneath the second frame member oppositely to the second light emission face.

Additionally, each of the first and second frame members contains an inner frame and a body; the inner frame of the first frame member is positioned above the first light emission face and supports the first display panel; the body of the first frame member is fixedly joined to a first lateral face of the heat dissipation base; the inner frame of the second frame member is positioned below the second light emission face and supports the second display panel; and the body of the second frame member is fixedly joined to a second lateral face of the heat dissipation base.

Additionally, the dual-sided display device further contains a first protection cover and a second protection cover; wherein each of the first and second protection covers contains a body and a frame extended from the body and bended towards the direction of the light guide plate; the body of the first protection cover is positioned on the first display panel and the first frame member; the frame of the first protection cover is plugged between the body of the first frame member and the heat dissipation base so as to secure the first protection cover; the body of the second protection cover is positioned beneath the second display panel and the second frame member; and the frame of the second protection cover is plugged between the body of the second frame member and the heat dissipation base so as to secure the second protection cover.

Additionally, the dual-sided display device further contains a first protection cover and a second protection cover; wherein each of the first and second protection covers contains a body and a frame extended from the body and bended towards the direction of the light guide plate; the body of the first protection cover is positioned on the first display panel and the first frame member; the body of the second protection cover is positioned beneath the second display panel and the second frame member; the frames of the first and second protection covers are fixedly joined to an outer face of the heat dissipation base so as to enclose all components of the dual-sided display device except the first and second protection covers.

Additionally, a portion of the first protection cover and a portion of the second protection that have no image are enamel portions.

Additionally, the frames of the first and second protection covers are enameled frames.

Additionally, the first protection cover and/or the second protection cover are made of one of acrylics and glass-reinforced plastics.

Additionally the heat dissipation base is made of at least one of gold, silver, copper, aluminum, and an alloy thereof.

Another objective of the present invention is to provide a backlight module for a dual-sided display device described above. The backlight module contains a light guide plate having at least a light entry face, a first light emission face, and a second light emission face oppositely positioned to the first light emission face; at least a light source unit positioned adjacent to the light entry face; at least a heat dissipation base carrying the light source unit and dissipating the heat produced by the light source unit to the environment; a first frame member and a second frame member, where the first frame member is positioned above the first light emission face and supports the first display panel; the second frame member is positioned below the second light emission face and supports the second display panel; the first and second frame members are fixedly joined to the heat dissipation base, and the light guide plate is fixedly positioned in an accommodation space surrounded by the first and second frame members, and the heat dissipation base.

Additionally, each of the first and second frame members contains an inner frame and a body; the inner frame of the first frame member is positioned above the first light emission face and supports the first display panel; the body of the first frame member is fixedly joined to a first lateral face of the heat dissipation base; the inner frame of the second frame member is positioned below the second light emission face and supports the second display panel; and the body of the second frame member is fixedly joined to a second lateral face of the heat dissipation base.

Additionally, the heat dissipation base is made of at least one of gold, silver, copper, aluminum, and an alloy thereof.

The dual-sided display device and the backlight module of the present invention has the light source units installed on the heat dissipation bases, achieving enhanced heat dissipation and narrow bezel for the dual-sided display device with a simple structural design. The dual-sided display device of the present invention further adopts protection covers to protect the display panels, to add visual appeal, and to reinforce the structural strength of the dual-sided display device.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
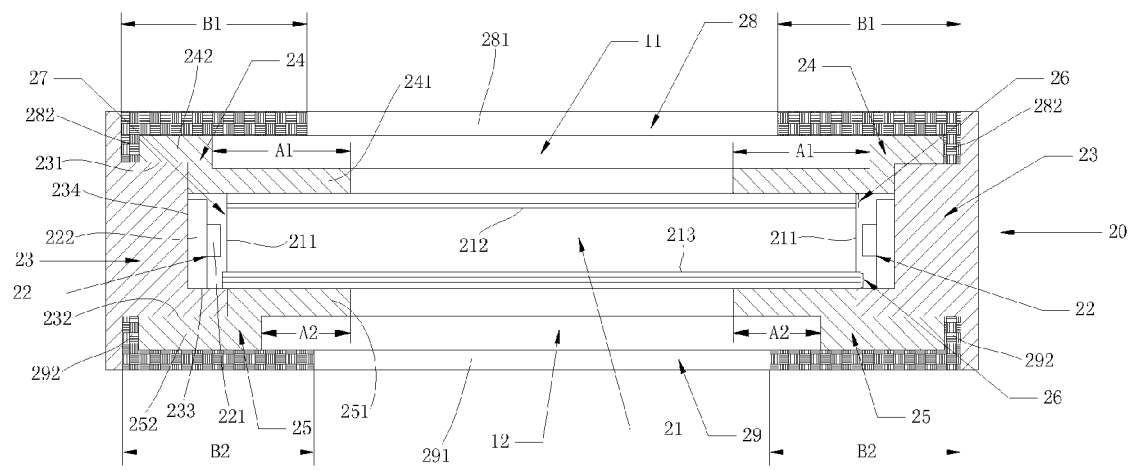
FIG. 1 is a schematic diagram showing a dual-sided display device according to a first embodiment of the present invention.

Terms describing relative spatial locations such as "above," "below," "upper," or "lower," are used to specify the relation of an element or a feature relative to other elements or features in the drawings. It should be understood that these terms should be interpreted to cover various other spatial relationships when the device is used or operated, in addition to what is illustrated in the drawings. For example, when a device is flipped upside down, an element or a feature specified as being "below" other elements or features is now "above" other elements or features. Therefore, terms like "below" are exemplary and should not be interpreted strictly. In other words, when the device is positioned in different orientations (such as being rotated 90 degrees), these terms should be interpreted accordingly.

The present invention is explained as follows in various embodiments along with the accompanied drawings. The same reference number always refers to the same element. The drawings may also exaggerate the thickness of some layer or region for clarity's sake. Detailed descriptions to publicly known structures or functions are omitted so that they are not confusingly considered as part of the present invention.

First Embodiment

FIG. 1 is a schematic diagram showing a dual-sided display device according to a first embodiment of the present invention.

As illustrated, the dual-sided display device contains a first display panel 11, a second display panel 12, and a backlight module 20. The backlight module 20 is capable of providing illumination to two sides, and has a first illumination face and a second illumination face. The first display panel 11 is positioned above or oppositely to the first illumination face. The second display panel 12 is positioned below or oppositely to the second illumination face. The first and second illumination faces provide illumination to the first and second display panels 11 and 12, respectively, so that the first and second display panels 11 and 12 are able to manifest images.

In the present embodiment, the first and second display panels 11 and 12 are LCD panels using existing technologies, detailed description is therefore omitted. The first display panels 11 has a greater dimension than that of the second display panel 12, however the present invention is not limited as such. In alternative embodiments, the first display panels 11 can have a dimension identical to or smaller than that of the second display panel 12.

In the present embodiment, the backlight module 20 contains a light guide plate 21, light source units 22, heat dissipation bases 23, a first frame member 24, a second frame member 25, and optical films 26.

The light guide plate 21 has four light entry faces 211, a first light emission face 212 joined to the four light entry faces 211 at the edges, and a second light emission face 213 positioned oppositely to the first light emission face 212. The first light emission face 212 can be the above-mentioned first illumination face, and the second light emission face 213 can be the above-mentioned second illumination face, of the backlight module 20.

In the present embodiment, two light source units 22 are positioned adjacent to two opposing light entry faces 211, but the present invention is not limited as such. In alternative embodiments, there can a single light source unit 22 positioned adjacent to a light entry face 211, or there can be four light source units 22, each positioned adjacent to a light entry face 211. In the present embodiment, each light source unit 22 contains a number of LEDs 221, and a PCB (Print Circuit Board) 222 carrying and powering the LEDs 221.

The heat dissipation bases 23 are positioned adjacent to the two opposing light entry faces 211 where the light source units 22 are positioned as well. Each heat dissipation base 23 has a first lateral face 231, a second lateral face 232, a third lateral face 233, and an inner face 234. Each light source unit 22 is supported by a heat dissipation base 23 by being positioned on the third lateral face 233 and attached to the inner face 234 of the heat dissipation base 23. In the present embodiment, the heat dissipation bases 23 are made of at least a highly thermal conductive metallic material, such as gold, silver, copper, aluminum, or an alloy thereof. The heat dissipation bases 23 therefore not only enhance the structural strength of the dual-sided display device, but also help dissipating the heat produced by the light source units 22 to the environment with their superior thermal conductivity.

The first and second frame members 24 and 25 are made of, for example, plastics. The first frame member 24 has an inner frame 241 and a body 242. The inner frame 241 is positioned above the first light emission face 212 and supports the first display panel 11. The body 242 is fixedly joined to the first lateral faces 231 of the heat dissipation bases 23. The second frame member 25 also has an inner frame 251 and a body 252. The inner frame 251 is positioned below the second light emission face 213 and supports the second display panel 12. The body 252 is fixedly joined to the second lateral faces 232 of the heat dissipation bases 23. The light guide plate 21 is as such fixedly positioned in an accommodation space 27 surrounded by the first and second frame members 24 and 25, and heat dissipation bases 23.

The optical films 26 are equally divided into two sets. One set of the optical films 26 are positioned between the inner frame 241 of the first frame member 24 and the first light emission face 212 for enhancing the brightness, saturation, uniformity of the light from the first light emission face 212. The other set of the optical films 26 are positioned between the inner frame 251 of the second frame member 25 and the second light emission face 213 for enhancing the brightness, saturation, uniformity of the light from the second light emission face 213.

In the present embodiment, a first protection cover 28 and a second protection cover 29 are further provided for protecting the first and second display panels 11 and 12, enhancing the structural strength and visual appeal of the dual-sided display device. The first and second protection covers 28 and 29 can be formed by acrylic injection molding, or can be made of glass-reinforced plastics. The first protection cover 28 contains a body 281 and a frame 282 extended from the body 281 and bended towards the direction of the light guide plate 21. The body 281 is positioned on the first display panel 11 and the body 242 of the first frame member 24. The frame 282 is plugged between the body 242 of the first frame member 24 and a heat dissipation base 23. The first protection cover 28 is as such secured. The second protection cover 29 also contains a body 291 and a frame 292 extended from the body 291 and bended towards the direction of the light guide plate 21. The body 291 is positioned beneath the second display panel 12 and the body 252 of the second frame member 25. The frame 292 is plugged between the body 252 of the second frame member 25 and a heat dissipation base 23. The second protection cover 29 is as such secured.

Due to the inner frames 241 and 251 of the first and second frame members 24 and 25, light cannot be projected from covered parts of the first and second light emission faces 212 and 213. Accordingly, a portion A1 of the first display panel 11 and a portion A2 of the second display panel 12 corresponding to the covered parts of the first and second light emission faces 212 and 213 cannot display images. Therefore, to enhance the quality of the dual-sided display device, a portion B1 of the first protection cover 28 corresponding to the portion A1 and a portion B2 of the second protection cover 29 corresponding to the portion A2 can be enameled. In other words, the no-image portions of the bodies 281 and 291 of the first and second protection covers 28 and 29 are enamel portions.

Additionally, in the present embodiment, the frames 282 and 292 of the first and second protection covers 28 and 29 can be enameled. The frames 282 and 292 of the first and second protection covers 28 and 29 therefore become enameled regions.

Second Embodiment

Figure 2:
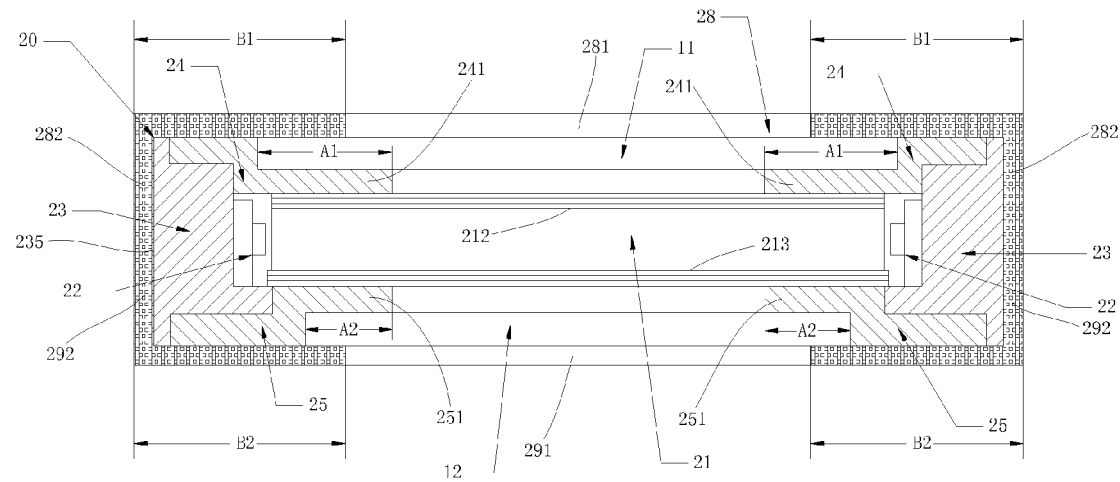
FIG. 2 is a schematic diagram showing a dual-sided display device according to a second embodiment of the present invention.

FIG. 2 is a schematic diagram showing a dual-sided display device according to a second embodiment of the present invention.

In the following, for what is identical to the first embodiment, the description is omitted. As illustrated in FIG. 2, a first protection cover 28 and a second protection cover 29 are provided for protecting the first and second display panels 11 and 12, enhancing the structural strength and visual appeal of the dual-sided display device. The first and second protection covers 28 and 29 can be formed by acrylic injection molding, or can be made of glass-reinforced plastics. The first protection cover 28 contains a body 281 and a frame 282 extended from the body 281 and bended towards the direction of the light guide plate 21. The body 281 is positioned on the first display panel 11 and the first frame member 24. The frame 282 is fixedly joined to an outer face 235 of a heat dissipation base 23. The second protection cover 29 also contains a body 291 and a frame 292 extended from the body 291 and bended towards the direction of the light guide plate 21. The body 291 is positioned below the second display panel 12 and the second frame member 25. The frame 292 is fixedly joined to the outer face 235 of the heat dissipation base 23. As such, the components of the dual-sided display device, i.e., the light guide plate 21, the light source units 22, heat dissipation bases 23, the first and second frame members 24 and 25, optical films 26, the first and second display panels 11 and 12, are all enclosed by the first and second protection covers 28 and 29 except the first and second protection covers 28 and 29 themselves.

Due to the inner frames 241 and 251 of the first and second frame members 24 and 25, light cannot be projected from covered parts of the first and second light emission faces 212 and 213. Accordingly, a portion A1 of the first display panel 11 and a portion A2 of the second display panel 12 corresponding to the covered parts of the first and second light emission faces 212 and 213 cannot display images. Therefore, to enhance the quality of the dual-sided display device, a portion B1 of the first protection cover 28 corresponding to the portion A1 and a portion B2 of the second protection cover 29 corresponding to the portion A2 can be enameled. In other words, the no-image portions of the bodies 281 and 291 of the first and second protection covers 28 and 29 are enamel portions.

Additionally, in the present embodiment, the frames 282 and 292 of the first and second protection covers 28 and 29 can be enameled.

As described above, the dual-sided display device and the backlight module of the present invention has the light source units installed on the heat dissipation bases, achieving enhanced heat dissipation and narrow bezel for the dual-sided display device with a simple structural design. The dual-sided display device of the present invention further adopts protection covers to protect the display panels, to add visual appeal, and to reinforce the structural strength of the dual-sided display device.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A dual-sided display device, comprising:
a light guide plate having at least a light entry face, a first light emission face, and a second light emission face oppositely positioned to the first light emission face;
at least a light source unit positioned adjacent to the light entry face;
at least a heat dissipation base carrying the light source unit and dissipating the heat produced by the light source unit to the environment;
a first frame member and a second frame member, where the first frame member is positioned above the first light emission face, the second frame member is positioned below the second light emission face, the first and second frame members are fixedly joined to the heat dissipation base, and the light guide plate is fixedly positioned in an accommodation space surrounded by the first and second frame members, and heat dissipation base; and
a first display panel and a second display panel, where the first display panel is fixedly positioned on the first frame member oppositely to the first light emission face, the second display panel is fixedly positioned beneath the second frame member oppositely to the second light emission face;
wherein each of the first and second frame members comprises an inner frame and a body; the inner frame of the first frame member is positioned above the first light emission face and supports the first display panel; the body of the first frame member is fixedly joined to a first lateral face of the heat dissipation base; the inner frame of the second frame member is positioned below the second light emission face and supports the second display panel; and the body of the second frame member is fixedly joined to a second lateral face of the heat dissipation base; a first protection cover and a second protection cover; wherein each of the first and second protection covers comprises a body and a frame extended from the body and bended towards the direction of the light guide plate; the body of the first protection cover is positioned on the first display panel and the first frame member; the frame of the first protection cover is plugged between the body of the first frame member and the heat dissipation base so as to secure the first protection cover; the body of the second protection cover is positioned beneath the second display panel and the second frame member; and the frame of the second protection cover is plugged between the body of the second frame member and the heat dissipation base so as to secure the second protection cover.

2. The dual-sided display device as claimed in claim 1, wherein a portion of the first protection cover and a portion of the second protection that have no image are enamel portions.

3. The dual-sided display device as claimed in claim 1, wherein the first protection cover and/or the second protection cover are made of one of acrylics and glass-reinforced plastics.

4. The dual-sided display device as claimed in claim 2, wherein the frame of the first protection cover is an enameled frame.

5. A dual-sided display device, comprising: a light guide plate having at least a light entry face, a first light emission face, and a second light emission face oppositely positioned to the first light emission face; at least a light source unit positioned adjacent to the light entry face; at least a heat dissipation base carrying the light source unit and dissipating the heat produced by the light source unit to the environment; a first frame member and a second frame member, where the first frame member is positioned above the first light emission face, the second frame member is positioned below the second light emission face, the first and second frame members are fixedly joined to the heat dissipation base, and the light guide plate is fixedly positioned in an accommodation space surrounded by the first and second frame members, and heat dissipation base; and a first display panel and a second display panel, where the first display panel is fixedly positioned on the first frame member oppositely to the first light emission face, the second display panel is fixedly positioned beneath the second frame member oppositely to the second light emission face; wherein each of the first and second frame members comprises an inner frame and a body; the inner frame of the first frame member is positioned above the first light emission face and supports the first display panel; the body of the first frame member is fixedly joined to a first lateral face of the heat dissipation base; the inner frame of the second frame member is positioned below the second light emission face and supports the second display panel; and the body of the second frame member is fixedly joined to a second lateral face of the heat dissipation base;

a first protection cover and a second protection cover; wherein each of the first and second protection covers comprises a body and a frame extended from the body and bended towards the direction of the light guide plate; the body of the first protection cover is positioned on the first display panel and the first frame member; the body of the second protection cover is positioned beneath the second display panel and the second frame member; the frames of the first and second protection covers are fixedly joined to an outer face of the heat dissipation base so as to enclose all components of the dual-sided display device except the first and second protection covers.

6. The dual-sided display device as claimed in claim 5, wherein a portion of the first protection cover and a portion of the second protection cover that have no image are enamel portions.

7. The dual-sided display device as claimed in claim 5, wherein the first protection cover and/or the second protection cover are made of one of acrylics and glass-reinforced plastics.

8. The dual-sided display device as claimed in claim 6, wherein the frame of the second protection cover is an enameled frame.

\* \* \* \* \*